United States Patent
Gonze et al.

(10) Patent No.: US 8,756,924 B2
(45) Date of Patent: Jun. 24, 2014

(54) HYBRID CATALYST CONVECTIVE PREHEATING SYSTEM

(75) Inventors: Eugene V. Gonze, Pinckney, MI (US); Halim G. Santoso, Novi, MI (US); Brian L. Spohn, Holly, MI (US); Bryan Nathaniel Roos, Novi, MI (US)

(73) Assignee: GM Global Technology Operations LLc

( * ) Notice: Subject to any disclaimer, the term of this patent is extended or adjusted under 35 U.S.C. 154(b) by 651 days.

(21) Appl. No.: 12/783,222

(22) Filed: May 19, 2010

(65) Prior Publication Data

US 2011/0283675 A1 Nov. 24, 2011

(51) Int. Cl.
F01N 3/00 (2006.01)
F01N 3/10 (2006.01)

(52) U.S. Cl.
USPC .......... 60/300; 60/273; 60/274; 60/286; 60/298; 60/303

(58) Field of Classification Search
USPC .................................. 60/273–324
See application file for complete search history.

(56) References Cited

U.S. PATENT DOCUMENTS

| H1113 H | * | 12/1992 | Yoshizaki | 60/284 |
| 5,390,488 A | * | 2/1995 | Ament et al. | 60/274 |
| 5,444,976 A | * | 8/1995 | Gonze et al. | 60/274 |
| 5,492,190 A | * | 2/1996 | Yoshida | 180/65.245 |
| 5,966,931 A | * | 10/1999 | Yoshizaki et al. | 60/284 |
| 6,304,813 B1 | * | 10/2001 | Ikeda et al. | 701/109 |
| 6,865,883 B2 | * | 3/2005 | Gomulka | 60/295 |
| 2002/0078683 A1 | * | 6/2002 | Katayama et al. | 60/285 |
| 2009/0025371 A1 | * | 1/2009 | Hermansson et al. | 60/286 |

* cited by examiner

*Primary Examiner* — Kenneth Bomberg
*Assistant Examiner* — Anthony Ayala Delgado

(57) ABSTRACT

A catalyst heating system includes a monitoring module, a mode selection module and an electrically heated catalyst (EHC) control module. The monitoring module monitors at least one of (i) a first temperature of a non-EHC of a catalyst assembly in an exhaust system of an engine and (ii) an active catalyst volume of the catalyst assembly. The mode selection module is configured to select an EHC heating mode and generate a mode signal based on the at least one of the first temperature and the active catalyst volume. The EHC control module controls current to an EHC of the catalyst assembly based on the mode signal.

17 Claims, 5 Drawing Sheets

HYBRID CATALYST CONVECTIVE PREHEATING SYSTEM

FIELD

The present disclosure relates to catalytic converters of an exhaust system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Catalytic converters are used in an exhaust system of an internal combustion engine (ICE) to reduce emissions. As an example, a three-way catalyst converter (TWC) reduces nitrogen oxide, carbon monoxide and hydrocarbons within an exhaust system. The three-way converter converts nitrogen oxide to nitrogen and oxygen, carbon monoxide to carbon dioxide and oxidizes unburnt hydrocarbons to produce carbon dioxide and water.

An average light off temperature at which a catalytic converter typically begins to function is approximately 200-350° C. As a result, a catalytic converter does not function or provides minimal emission reduction during a warm up period that occurs upon a cold start up of an engine. Operating temperatures of a catalytic converter may be approximately 400-900° C. after the warm up period. Efficiency of a catalytic converter improves with an increase in operating temperature. For the stated reasons, the quicker a catalytic converter increases to the light off temperature upon a cold start the better the emission reduction performance of an exhaust system.

Hybrid electric vehicles may include an ICE and one or more electric motors. The ICE may have an exhaust system with a catalytic converter. The ICE may be deactivated repeatedly and/or for extended periods of time to conserve fuel. Temperature of the catalytic converter decreases when the ICE is deactivated. A start/stop vehicle includes and deactivates an ICE during, for example ICE idle periods and/or when velocity of the start/stop vehicle is 0 m/s. As a result, a catalytic converter may provide limited emission reduction performance upon starting of a hybrid electric vehicle and a start/stop vehicle.

SUMMARY

In one embodiment, a catalyst heating system is provided and includes a monitoring module, a mode selection module and an electrically heated catalyst (EHC) control module. The monitoring module monitors at least one of (i) a first temperature of a non-EHC of a catalyst assembly in an exhaust system of an engine and (ii) an active catalyst volume of the catalyst assembly. The mode selection module is configured to select an EHC heating mode and generate a mode signal based on the at least one of the first temperature and the active catalyst volume. The EHC control module controls current to an EHC of the catalyst assembly based on the mode signal.

In other features, a catalyst heating system is provided and includes a first monitoring module that monitors a first temperature of a non-EHC of a catalyst assembly in an exhaust system of an engine. A second monitoring module that monitors a second temperature of an EHC of the catalyst assembly. A mode selection module is configured to select an engine speed maintaining mode and an air pumping mode and generates a mode signal based on the first temperature and the second temperature. An air pumping module initiates at least one pumping action to pump air into an inlet of the catalyst assembly during the air pumping mode. The at least one pumping action includes (i) rotating a crankshaft of the engine when the engine is deactivated and (ii) activating an air pump.

In other features, a method of operating a catalyst heating system is provided. The method includes monitoring at least one of (i) a first temperature of a non-EHC of a catalyst assembly in an exhaust system of an engine and (ii) an active catalyst volume of the catalyst assembly. An EHC heating mode is selected and a mode signal is generated based on the at least one of the first temperature and the active catalyst volume. Current to an EHC of the catalyst assembly is controlled based on the mode signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
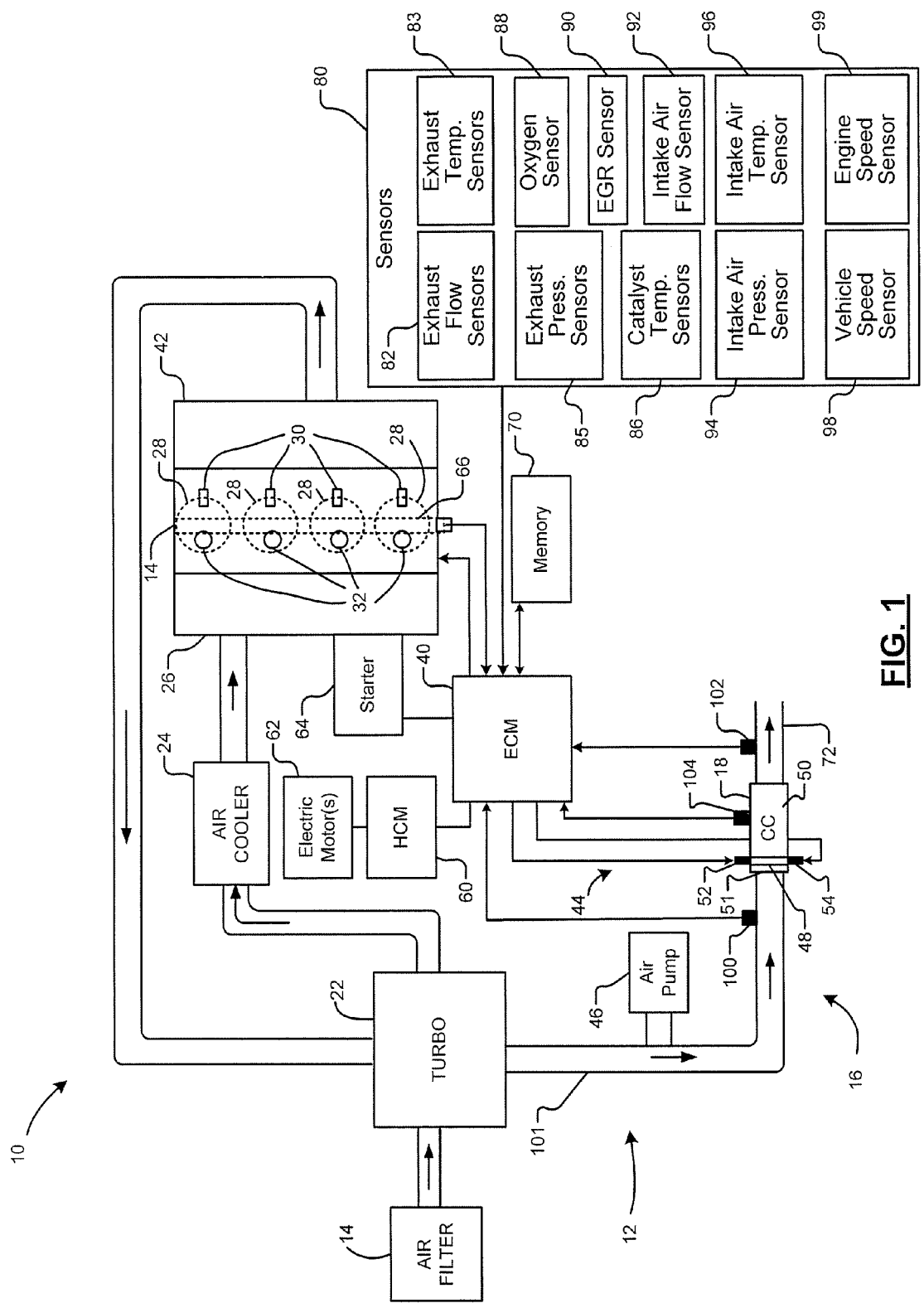
FIG. 1 is a functional block diagram of an exemplary engine system incorporating a catalyst heating system in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In FIG. 1, an exemplary engine system 10 that includes a catalyst heating system 12 is shown. The engine system 10 may be a hybrid electric vehicle system, a plug-in hybrid electric vehicle system, a start/stop vehicle system, a partial zero emissions vehicle (PZEV) system, a super ultra low emissions vehicle (SULEV) system or other stricter emissions vehicle system (e.g., SULEV20), etc. The engine system 10 includes an engine 14 with an exhaust system 16. The exhaust system 16 includes a catalytic converter (CC) 18. The catalyst heating system 12 heats catalyst(s) in the CC 18 (catalyst assembly). The catalyst heating system 12 may heat the catalyst(s) before starting of the engine 14. Although the engine system 10 is shown as a spark ignition engine, the engine system 10 is provided as an example. The catalyst heating system 12 may be implemented on various other engine systems, such as diesel engine systems.

The engine system 10 includes the engine 14 that combusts an air and fuel mixture to produce drive torque. Air enters the engine 14 by passing through an air filter 20. Air passes through the air filter 20 and may be drawn into a turbocharger 22. The turbocharger 22 when included compresses the fresh air. The greater the compression, the greater the output of the engine 14. The compressed air passes through an air cooler 24 when included before entering an intake manifold 26.

Air within the intake manifold 26 is distributed into cylinders 28. Fuel is injected into the cylinders 28 by fuel injectors 30. Spark plugs 32 ignite air/fuel mixtures in the cylinders 28. Combustion of the air/fuel mixtures creates exhaust. The exhaust exits the cylinders 28 into the exhaust system 16.

The catalyst heating system 12 includes the exhaust system 16 and an engine control module (ECM) 40. The exhaust system 16 includes the CC 18, the ECM 40, the exhaust manifold 42, a catalyst heating circuit 44, and an air pump 46. As an example, the CC 18 may include a three-way catalyst (TWC). The CC 18 may reduce nitrogen oxides NOx, oxidizes carbon monoxide (CO) and oxidizes unburnt hydrocarbons (HC) and volatile organic compounds. The CC 18 oxidizes the exhaust based on a post combustion air/fuel ratio. The amount of oxidation increases the temperature of the exhaust.

The CC 18 includes an electrically heated catalyst (EHC) 48 and a non-EHC 50. The EHC 48 is actively heated. The non-EHC 50 is passively heated through adjacent heat transfer and/or convection. The EHC 48 and the non-EHC 50 may refer to different portions of a single catalyst or may be distinct adjacent catalysts. For example only, the EHC 48 may have approximately 20% of the total catalyst mass of the CC 18. The non-EHC 50 may have approximately 70-80% of the total catalyst mass. An additional non-EHC 51 may be adjacent to and upstream from the EHC 48. The EHC 51 may increase in temperature due to adjacent heat transfer from the EHC 48. The EHC 48 receives a selected current and/or a selected voltage from the catalyst heating circuit 44. Electrically heating of the EHC 48 and not the non-EHC 50 allows for quick activation of the EHC 48 for off cycle emission reduction.

The catalyst heating circuit 44 includes one or more terminals. In the example shown, two terminals are provided; a supply terminal 52 and a ground or return terminal 54. In the example shown, the EHC 48 may perform as a resistive element between the terminals 52, 54 and receive current from the supply terminal 52. Temperature of the EHC 48 increases while current is supplied to the supply terminal 52. For example only, the voltage supplied to the terminals This allows the EHC 48 to increase to a functioning or active temperature (e.g., ≥a catalyst light off temperature) when the engine 14 is not activated. The engine 14 is activated when spark and fuel of the engine 14 are activated. Different voltage levels applied to the terminals 52, 54 may be, for example, 12V-42V. Voltage levels greater than 42V may be used.

Optionally, an EGR valve (not shown) re-circulates a portion of the exhaust back into the intake manifold 26. The remainder of the exhaust is directed into the turbocharger 22 to drive a turbine. The turbine facilitates the compression of the fresh air received from the air filter 20. Exhaust flows from the turbocharger 22 to the CC 18.

The engine system 10 may also include a hybrid control module (HCM) 60 and one or more electric motor(s) 62. The HCM 60 may be part of the ECM 40 or may be a stand alone control module, as shown. The HCM 60 controls operation of the electric motor(s) 62. The electric motor(s) 62 may supplement and/or replace power output of the engine 14. The electric motor(s) 62 may be used to adjust speed of the engine 14 (i.e. rotating speed of a crankshaft 66 of the engine 14).

The catalyst heating system 12 may operate in a catalyst heating mode, an engine speed maintaining mode and an air pumping mode (may be referred to as a secondary air injection mode). The catalyst heating system 12 may operate in these modes when the engine 14 is deactivated. The engine 14 is deactivated when spark and fuel to the engine 14 are disabled. The catalyst heating mode includes activating the catalyst heating circuit 44 to heat the EHC 48. The ECM 40 controls current and voltage supplied to the terminals 52, 54 and heating time of the EHC 48 during the catalyst heating mode.

The ECM 40 and/or HCM 60 may control operation of the electric motor(s) 62 to maintain a current engine speed during the engine speed maintaining mode. The electric motor(s) 62 may be connected to the engine 14 via a belt/pulley system, via a transmission, one or more clutches, and/or via other mechanical connecting devices. In one embodiment, the ECM 40 and/or HCM 60 activates (powers) the electric motor(s) 62 to prevent the crankshaft 66 from rotating during the engine speed maintaining mode (engine speed maintained at 0 revolutions per minute (RPM)). This may occur when vehicle speed is greater than 0 meters (m)/second (s). The ECM 40 and/or HCM 60 may control operation of the electric motor(s) 62 and/or starter 64 to rotate the crankshaft 66 during the air pumping mode. The ECM 40 and/or HCM 60 may deactivate the electric motor(s) 62 to allow the crankshaft 66 to rotate when vehicle speed is greater than 0 m/s.

During the air pumping mode, air is pumped into the exhaust system 16 to convectively heat the non-EHC 50 after the EHC 48 is heated to, for example, the catalyst light off temperature. During the air pumping mode, the engine 14 may be used as an air pump 46 to pump air into the exhaust system 16. During the air pumping mode the engine 14 is deactivated, but intake and exhaust valves of the engine 14 are permitted to open and close. This allows air to be drawn into and pumped out of cylinders 28. As an alternative or in addition to rotating the crankshaft 66, the ECM 40 may activate the air pump 46 during the air pumping mode. The air pump 46 is connected to and is used to pump air into the exhaust system 16 upstream from the CC 18. The air pump 46 may pump ambient air into the exhaust system 16. The ambient air may be directed to the exhaust manifold 42 and/or exhaust valves of the engine 14.

The ECM 40 and/or HCM 60 control the engine 14, the catalyst heating system 12, the air pump 46 and the starter 64 based on sensor information. The sensor information may be obtained directly via sensors and/or indirectly via algorithms and tables stored in memory 70. Some example sensors 80 for determining exhaust flow levels, exhaust temperature levels, exhaust pressure levels, catalyst temperatures, oxygen levels, intake air flow rates, intake air pressure, intake air temperature, vehicle speed, engine speed, EGR, etc are shown. Exhaust flow sensors 82, exhaust temperature sensors 83, exhaust pressure sensors 85, catalyst temperature sensors 86, an oxygen sensor 88, an EGR sensor 90, an intake air flow sensor 92, an intake air pressure sensor 94, an intake air temperature sensor 96, vehicle speed sensor 98 and an engine speed sensor 99 are shown.

A first exhaust flow, pressure and/or temperature sensor 100 may be connected to a first exhaust conduit 101 and upstream from the CC 18. A second exhaust flow, pressure and/or temperature sensor 102 may be connected to a second exhaust conduit 103 downstream from the CC 18. A catalyst temperature sensor 104 may be connected to the CC 44. The ECM 40 may control operation of the engine 14 and the catalyst heating system 12 based on the information from the sensors 80, the first and second exhaust sensors 100, 102 and the catalyst temperature sensor 104.

Figure 2:
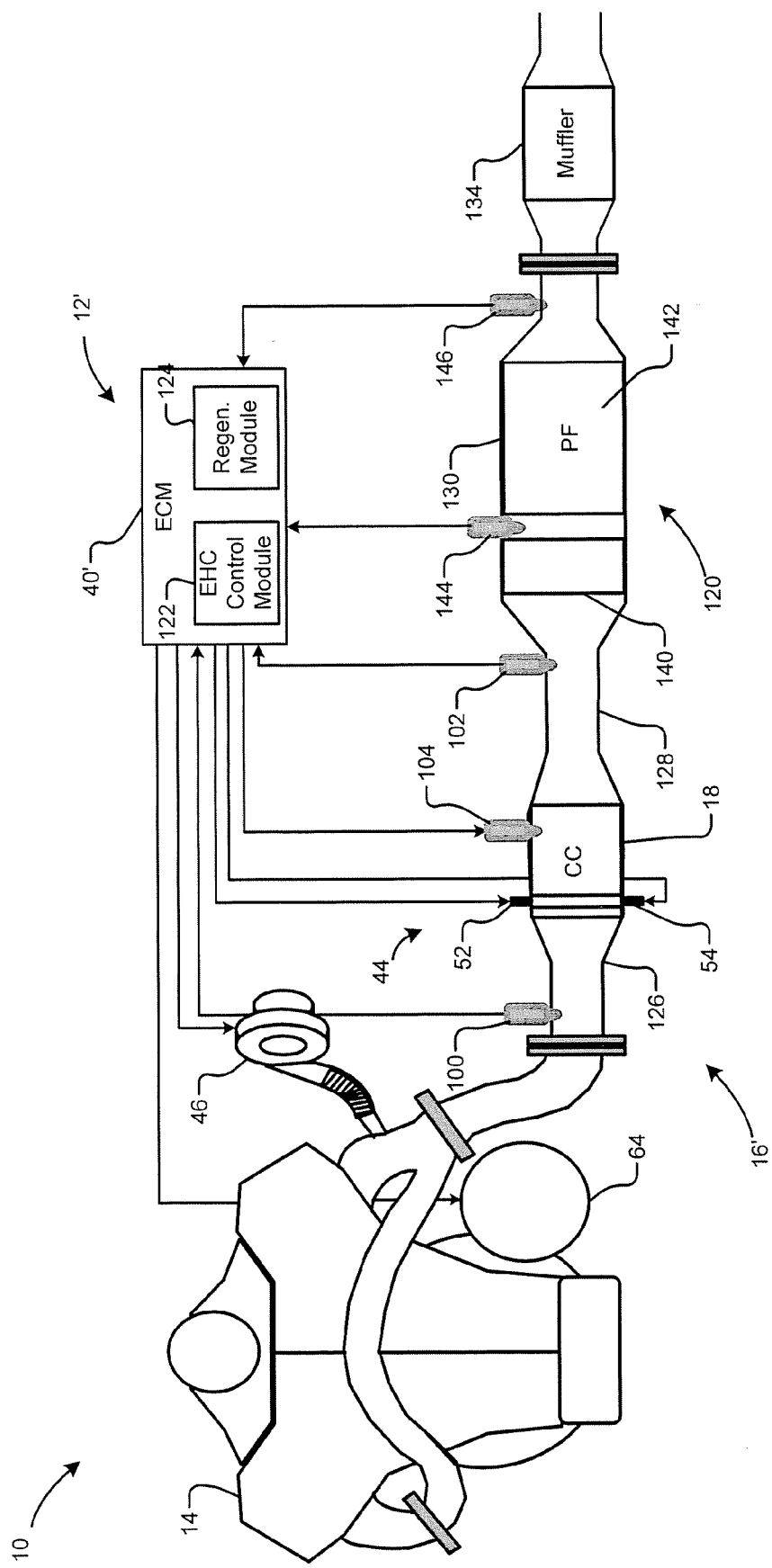
FIG. 2 is a functional block diagram of another engine system and corresponding catalyst heating system in accordance with the present disclosure.

In FIG. 2, a functional block diagram of another engine system 10' is shown. The engine system 10' may be part of the engine system 10. The engine system 10' includes the engine 14, a catalyst heating system 12', an exhaust system 16', an ECM 40' and may include a regeneration system 120. The regeneration system 120 is provided for example purposes only. Portions and/or all of the regeneration system 120 may not be included the engine system 10'.

The engine 14' may be, for example, a spark ignition or diesel engine. The ECM 40' may include an EHC control module 122 and a regeneration module 124. The EHC control module 122 controls operation of the catalyst heating system 12'. The regeneration module 124 controls operation of the regeneration system 120. In the example shown, the exhaust system 16' includes in the following order: an exhaust manifold 42', a first exhaust conduit 126, the CC 18, a second exhaust conduit 128, a catalyst and filter assembly 130, a third exhaust conduit 132, and a muffler 134.

The catalyst heating system 12' includes the engine 14, the CC 18, the catalyst heating circuit 44, the air pump 46, the starter 64, and/or the EHC control module 122. The CC 18 includes the EHC 48 and the non-EHC 50. The catalyst heating circuit 44 may include the terminals 52, 54. The catalyst heating system 12' may also include the sensors 100, 102, 104.

The regeneration system 120 includes the engine 14, the regeneration module 124 and the catalyst and filter assembly 130. The catalyst and filter assembly 130 may include a catalyst 140, such as a three-way catalyst, and a particulate filter (PF) 142. The catalyst 140 oxides CO remaining in the exhaust received from the CC to generate $CO_2$. The catalyst 140 may also reduce nitrogen oxides NOx and oxidize unburnt hydrocarbons (HC) and volatile organic compounds. The PF 142 receives exhaust from the catalyst 140 and filters any soot particulates present in the exhaust. The catalyst and filter assembly 130 may include heating elements (not shown) to facilitate regeneration of the PF 142.

The regeneration module 120 may control operation of the engine 14 based on information from, for example, the second flow, pressure and/or temperature exhaust sensor 102 and/or from a third flow, pressure and/or temperature exhaust sensor 144 and a fourth flow, pressure and/or temperature exhaust sensor 146. The second exhaust sensor 102 is connected upstream from the catalyst and filter assembly 130, on the second exhaust conduit 128, and between the CC 18 and the catalyst and filter assembly 130. The third exhaust sensor 144 is connected to the catalyst and filter assembly 130. The fourth exhaust sensor 146 is connected to the third exhaust conduit 132 and downstream of the catalyst and filter assembly 130. A portion of the PF 142 may be heated to a regeneration temperature to initiate an exothermic reaction that propagates down the PF 142. This heating may be performed based on information from the exhaust sensors 102, 144, 146 and a current soot loading of the PF 132.

The ECM 40' may estimate soot loading of the PF 132. When the estimated loading is at a predetermined level and/or the exhaust flow rate is within a desired range, operation of the engine 14 and the regeneration system 120 are controlled to initiate the regeneration process. The duration of the regeneration process may be varied based upon an estimated amount of particulate matter within the PF 132.

Figure 3:
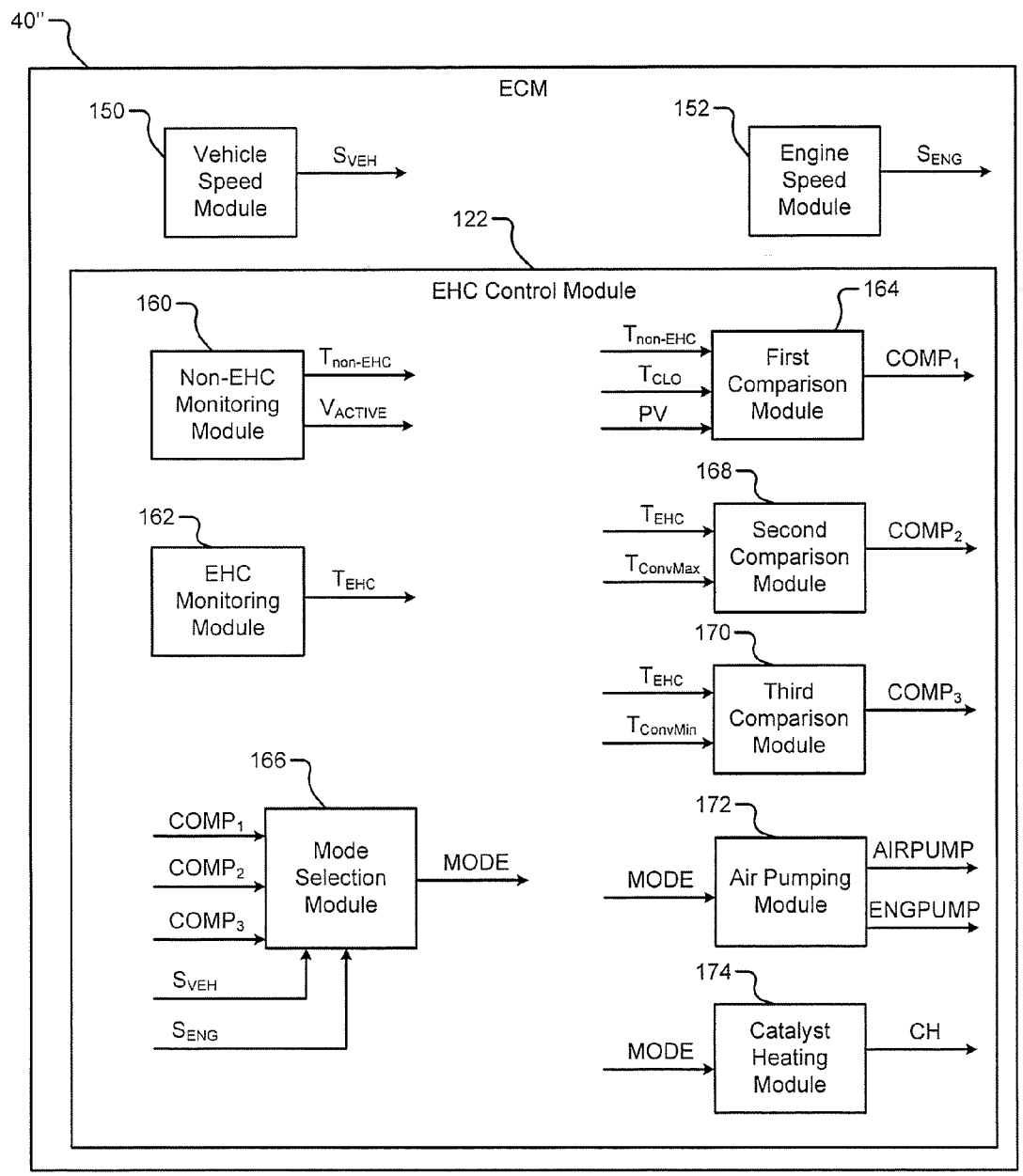
FIG. 3 is a functional block diagram of an engine control module in accordance with the present disclosure.

Referring now also to FIG. 3, a functional block diagram of an ECM 40" is shown. The ECM 40" may be used in the catalyst heating systems 12, 12' of FIGS. 1 and 2. The ECM 40" includes the EHC control module 122 and may further include a vehicle speed module 150 and an engine speed module 152. The EHC control module 122 may control operation of the engine 14, the catalyst heating circuit 44, the air pump 46, the electric motor(s) 62 and/or starter 64. The vehicle speed module 150 determines speed of a vehicle based on information from, for example, the vehicle speed sensor 98. The engine speed module 152 determines speed of the engine 14 based on information from, for example, the engine speed sensor 99.

The ENG control module 122 includes a non-EHC monitoring module (first monitoring module) 160, a EHC monitoring module (second monitoring module) 162, a mode selection module 164, a first comparison module 166, a second comparison module 168, a third comparison module 170, an air pumping module 172, and a catalyst heating module 174. The EHC control module 122 operates in the catalyst heating mode, the engine speed maintaining mode and the air pumping mode, which are selected by the mode selection module 166. The EHC control module 122 may operate in more than one of the modes during the same period.

Figure 4:
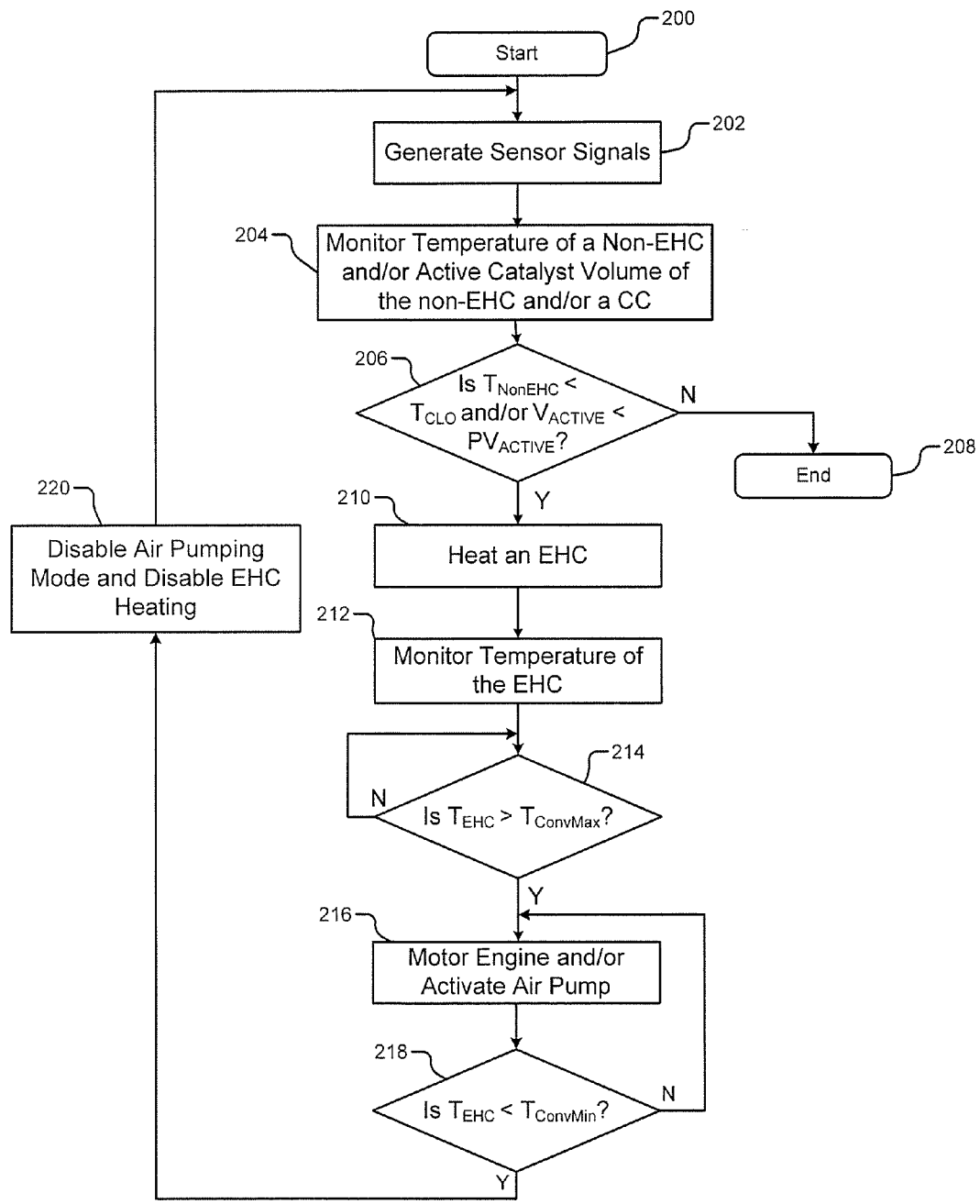
FIG. 4 illustrates a method of operating a catalyst heating system in accordance with the present disclosure.

Referring now also to FIG. 4, a method of operating a catalyst heating system is shown. Although the method is described with respect to the embodiments of FIGS. 1-3, the method may be applied to other embodiments of the present disclosure. The method may begin at 200. Below-described tasks 202-220 may be iteratively performed and may be performed by one of the ECMs 40, 40', 40" of FIGS. 1-3.

At 202, sensor signals are generated. The sensor signals may include exhaust flow signals, exhaust temperature signals, exhaust pressure signals, catalyst temperature signals, an oxygen signal, an intake air flow signal, an intake air pressure signal, an intake air temperature signal, a vehicle speed signal, an engine speed signal, an EGR signal, etc., which may be generated by the above-described sensors 80 and 100-104, 144, 146 of FIGS. 1 and 2.

At 204, the first monitoring module 160 monitors a temperature of the non-EHC 50 and/or an active catalyst volume of the non-EHC 50 and/or the CC 18 and generates a first temperature signal $T_{non-EHC}$ and/or an active volume signal $V_{ACTIVE}$. The active volume signal $V_{ACTIVE}$ may be generated by the first monitoring module 160 or by a dedicated active catalyst volume monitoring module.

The first temperature signal $T_{non-EHC}$ may be directly determined via, for example, the exhaust sensor 102. As an alternative, the first temperature signal $T_{non-EHC}$ may be indirectly estimated using, for example, equation 1. The active volume signal $V_{ACTIVE}$ may be estimated using, for example, equation 2.

$$T_{non-EHC} = f \left\{ \begin{array}{l} F_{Rate}, S_{ENG}, C_{Mass}, C_{IMP}, T_{EHC}, DC, \\ EHC_{ActTime}, EHC_{Current}, EHC_{Volt}, T_{AMB}, CAM, SPK \end{array} \right\} \quad (1)$$

-continued $$V_{ACTIVE} = f \left\{ \begin{array}{l} T_{non\text{-}EHC}, F_{Rate}, S_{ENG}, C_{Mass}, C_{IMP}, T_{EHC}, DC, \\ EHC_{ActTime}, EHC_{Current}, EHC_{Volt}, T_{AMB}, CAM, SPK \end{array} \right\} \quad (2)$$

$F_{Rate}$ is exhaust flow rate through the CC 18, which may be a function of mass air flow and fuel quantity supplied to the cylinders 28. The mass air flow may be determined by a mass air flow sensor, such as the intake air flow sensor 92. $S_{ENG}$ is speed of the engine 14 (i.e. rotational speed of the crankshaft 66). DC is duty cycle of the engine. $C_{Mass}$ is mass of the EHC 48 and/or the non-EHC 50 or total mass of the catalysts of the CC 18. $C_{IMP}$ is resistance or impedance of the EHC 48. $EHC_{ActTime}$ is time that the catalyst heating system 12 is activated. $EHC_{Current}$ is current level applied to the EHC 48. $EHC_{Volt}$ is voltage applied to the EHC 48. $T_{amb}$ is ambient temperature. CAM is cam phasing of the engine 14. SPK is spark timing. The temperature signals and the active catalyst volume signal $V_{ACTIVE}$ may be based on one or more of the engine system parameters provided in equations 1 and 2 and/or other engine system parameters, such as mass of the EHC 48 $EHC_{Mass}$.

At 206, the first comparison module 164 compares the first temperature signal $T_{non\text{-}EHC}$ to a catalyst light off temperature $T_{CLO}$ and/or compares the active catalyst volume $V_{ACTIVE}$ to a predetermined active volume $PV_{ACTIVE}$ and generates a first comparison signal $COMP_1$. The catalyst light off temperature $T_{CLO}$ may be for example between 200-350° C. In one embodiment, the CLO temperature $T_{CLO}$ is approximately 250° C. The predetermined active volume $PV_{ACTIVE}$ refers to a target catalyst volume of the non-EHC 50 and/or the CC 18 that is at a temperature that is greater than or equal to an active catalyst temperature (temperature at which the catalyst is functioning and reducing emissions or the catalyst light off temperature). As an example, the target catalyst volume may be approximately 30-40% of the non-EHC 50 and/or the 30-40% of the total catalyst volume of the CC 18.

Control may end at 208 when the first temperature signal $T_{non\text{-}EHC}$ is not less than the catalyst light off temperature $T_{CLO}$ and/or when the active catalyst volume $V_{ACTIVE}$ is not less than the predetermined active volume $PV_{ACTIVE}$, otherwise control may proceed to 210. As an alternative to ending at 208, control may return to 202.

At 210, the mode selection module 166 selects the catalyst heating mode and generates a mode selection signal MODE based on the first comparison signal $COMP_1$. The catalyst heating circuit 44 is activated to heat the EHC 48 during the catalyst heating mode. The catalyst heating module 174 generates a catalyst heating signal CH based on the mode selection signal MODE. The catalyst heating signal CH may indicate a selected current and/or voltage to apply to terminals of the catalyst heating system 12. The catalyst heating mode may be selected based on the engine speed $S_{ENG}$ and/or a vehicle speed $S_{VEH}$. As an example, catalyst heating mode may be selected when the engine speed is less than a predetermined engine speed. As another example, catalyst heating mode may be selected when the engine speed is approximately 0 revolutions-per-minute (RPM).

At 212, the second monitoring module 162 monitors temperature of the EHC 48 and generates a second temperature signal $T_{EHC}$. The second temperature signal $T_{EHC}$ may be determined directly from an EHC temperature sensor and/or indirectly estimated, for example, using equation 3, where $EHC_{Mass}$ is the mass of the EHC 48.

$$T_{EHC} = f\{F_{Rate}, S_{ENG}, DC, EHC_{Mass}, EHC_{ActTime}, EHC_{Current}, EHC_{Volt}\} \quad (3)$$

At 214, the second comparison module 168 compares the second temperature signal $T_{EHC}$ to a convection maximum temperature $T_{ConvMax}$ and generates a second comparison signal $COMP_2$. The convection maximum temperature $T_{ConvMax}$ refers to a predetermined maximum temperature for the EHC 48 during the catalyst heating mode. The convection maximum temperature $T_{ConvMax}$ may be based on a predetermined maximum temperature for the non-EHC 50 during the catalyst heating mode. The convection maximum temperature $T_{ConvMax}$ may be set to a temperature between, for example, 450-500° C. when a predetermined maximum temperature for the non-EHC is 400° C. The convection maximum temperature $T_{ConvMax}$ is a predetermined amount less than the predetermined maximum temperature for the non-EHC 50. During convective heating of the non-EHC 50, as performed at 216, temperature of the non-EHC 50 is approximately 50-100° C. less than that of the EHC 48. Control proceeds to 216 when the second temperature signal $T_{EHC}$ is greater than the convection maximum temperature $T_{ConvMax}$.

At 216, the mode selection module 166 selects the air pumping mode and generates the mode selection signal MODE based on the second comparison signal $COMP_2$. During the air pumping mode, the engine 14 is motored (crankshaft is rotated) and/or the air pump is activated. Speed of the engine 14, the electric motor(s) 62, and/or starter 64 is set based on a predetermined flow rate for convective heating of the non-EHC 50.

The air pumping module 172 generates an air pump signal AIRPUMP and/or an engine motoring signal ENGPUMP based on the mode selection signal MODE. The air pump signal activates the air pump 46. The engine motoring signal ENGPUMP initiates operation of the engine 14 as an air pump and may be used to control operation of the electric motor(s) 62 and/or starter 64.

At 218, the third comparison module 168 compares the second temperature signal $T_{EHC}$ to a convection minimum temperature $T_{ConvMin}$ and generates a third comparison signal $COMP_3$. The convection minimum temperature $T_{ConvMin}$ refers to a minimum temperature of the EHC that maintains the non-EHC at a temperature equal to or greater than the catalyst light off temperature. As an example, the convection minimum temperature $T_{ConvMin}$ may be set approximately 50-100° C. less than the convection maximum temperature $T_{ConvMax}$. Control proceeds to 220 when the second temperature signal $T_{EHC}$ is less than the convection minimum temperature $T_{ConvMin}$, otherwise control may return to 216.

At 220, the air pumping mode and/or EHC heating may be disabled. This may include permitting spark and fuel to be enabled, no longer using the engine 14 as an air pump, and/or deactivating the air pump 46. The enabling and disabling EHC heating described above allows for energy efficient catalyst heating. Control may end after 220 or may return to 202, as shown.

The above-described method may end during any of tasks 202-220 when, for example, the engine 14 is activated. Activation of the engine 14 may include activating spark and fuel of the engine 14 and deactivating the air pump 46. The air pump 46 may be used for exothermic assistance when the engine 14 is activated to adjust temperature of a catalyst with minimal associated fuel consumption. The above-described tasks performed at 202-220 are meant to be illustrative examples; the tasks may be performed sequentially, synchronously, simultaneously, continuously, during overlapping time periods or in a different order depending upon the application. The above-described tasks are performed to heat and maintain temperature of catalysts of a catalyst assembly at or greater than a catalyst light off temperature.

Figure 5:
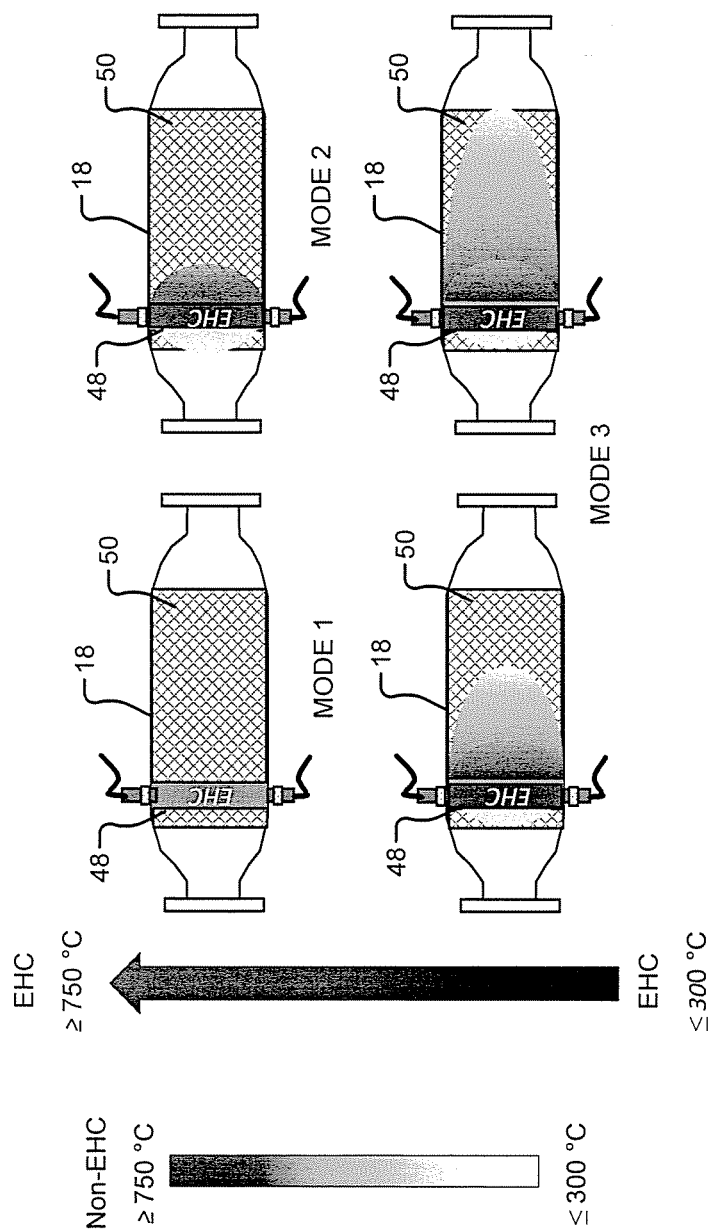
FIG. 5 is a thermal catalyst assembly diagram illustrating three modes of the method of FIG. 4.

In FIG. 5, a thermal catalyst assembly diagram illustrating three modes MODE 1-3 of the method of FIG. 4 is shown. The thermal catalyst diagram includes the CC 18 with the EHC 48 and the non-EHC 50.

In mode 1, the EHC 48 is deactivated. In MODE 2, a catalyst heating circuit (e.g., the catalyst heating circuit 44 of FIG. 1) is activated to heat the EHC 48 and control is operating in the engine speed maintaining mode. The heating may be provided by a wall source, such as a battery. The heating may not be provided via fueling of an engine, which conserves fuel. In MODE 2, control is not operating in the air pumping mode. MODE 3 is performed after MODE 2 and includes maintaining activation of the catalyst heating circuit. In MODE 3, control may not be operating in the engine speed maintaining mode and is operating in the air pumping mode to convectively heat the non-EHC 50. For MODE 3, the CC 18 is shown at a first time and at a second time, which occurs after the first time. The longer the catalyst heating circuit is activated and the air pumping mode is enabled the more the temperature of the non-EHC 50 increases.

The above-described embodiments allow for quick heating of a catalyst without enabling fuel of an engine and heating of the engine. As a result, catalysts of an exhaust system are heated and/or are active (total catalyst heated volume is increased) before starting the engine. As the catalysts are heated before the engine is started, fuel is not used to heat the catalysts. The embodiments also limit excessive engine run time needed to diagnose catalyst light off. The above-described embodiments reduce emission output of the engine by heating catalysts before activation of an engine.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A catalyst heating system comprising:
   a first electronic circuit configured to monitor at least one of (i) a first temperature of a non-electrically heated catalyst (EHC) of a catalyst assembly in an exhaust system of an engine and (ii) an active catalyst volume of the catalyst assembly;
   a second electronic circuit configured to select an EHC heating mode and generate a mode signal based on the at least one of the first temperature and the active catalyst volume;
   a third electronic circuit configured to control current to an EHC of the catalyst assembly based on the mode signal;
   a fourth electronic circuit configured to monitor a second temperature of the EHC; and
   a fifth electronic circuit configured to compare the second temperature to an EHC convection temperature and generate a first comparison signal,
   wherein the EHC convection temperature is a predetermined amount greater than a predetermined non-EHC convection temperature,
   wherein the second electronic circuit is configured to, while current is supplied to the EHC, select an air pumping mode to prevent the first temperature from exceeding the predetermined non-EHC convection temperature, and
   wherein the air pumping mode includes at least one of (i) rotating a crankshaft of the engine while the engine is deactivated, and (ii) activating an air pump.

2. The catalyst heating system of claim 1, further comprising a sixth electronic circuit, wherein:
   the second electronic circuit is configured to select an engine speed maintaining mode and the air pumping mode and generate the mode signal based on the second temperature;
   the sixth electronic circuit is configured to initiate at least one pumping action to pump air into an inlet of the catalyst assembly during the air pumping mode; and
   the at least one pumping action includes the at least one of (i) the rotating of the crankshaft of the engine when the engine is deactivated, and (ii) the activating of the air pump.

3. The catalyst heating system of claim 2, wherein spark and fuel of the engine are disabled when the engine is deactivated.

4. The catalyst heating system of claim 2, further comprising a seventh electronic circuit configured to compare the active catalyst volume to a predetermined volume and generate a second comparison signal,
   wherein the second electronic circuit is configured to select the air pumping mode when the second comparison signal indicates that the active catalyst volume is less than the predetermined volume.

5. The catalyst heating system of claim 2, further comprising a seventh electronic circuit configured to compare the first temperature to a catalyst light off temperature and generate a second comparison signal,
   wherein the second electronic circuit is configured to select the air pumping mode when the second comparison signal indicates that the first temperature is less than the light off temperature.

6. The catalyst heating system of claim 5, wherein:
   the EHC convection temperature is a maximum EHC convection temperature;
   the second electronic circuit is configured to select the air pumping mode when the second comparison signal indicates that the second temperature is greater than the maximum EHC convection temperature; and
   the second electronic circuit is configured to select the engine speed maintaining mode when the second comparison signal indicates that the second temperature is less than or equal to the maximum EHC convection temperature.

7. The catalyst heating system of claim 6, further comprising an eighth electronic circuit configured to compare the second temperature to a minimum EHC convection temperature and generate a third comparison signal,
   wherein the second electronic circuit is configured to select the engine speed maintaining mode when the third comparison signal indicates that the second temperature is less than the minimum EHC convection temperature, and
   wherein the second electronic circuit is configured to select the air pumping mode when the third comparison signal indicates that the second temperature is greater than or equal to the minimum EHC convection temperature.

8. The catalyst heating system of claim 2, further comprising the catalyst assembly, wherein:
   the catalyst assembly comprises
      the non-EHC, and
      the EHC upstream from the non-EHC; and
   the third electronic circuit is configured to transfer heat from the EHC to the non-EHC during the air pumping mode.

9. The catalyst heating system of claim 2, wherein:
the third electronic circuit is configured to activate the air pump to pump ambient air into the exhaust system upstream from the catalyst assembly during the air pumping mode;
the second electronic circuit is configured to select the air pumping mode when an engine speed is less than a predetermined speed; and
the third electronic circuit is configured to control operation of an electric motor to
prevent the crankshaft from rotating during the engine speed maintaining mode, and
permit the crankshaft to rotate during the air pumping mode.

10. The catalyst heat system of claim 1, wherein the first electronic circuit is configured to estimate the at least one of the first temperature and the active catalyst volume based on an engine speed, a flow rate, and at least one of a current and voltage of the EHC.

11. A catalyst heating system comprising:
a first electronic circuit configured to monitor a first temperature of a non-electrically heated catalyst (EHC) of a catalyst assembly in an exhaust system of an engine;
a second electronic circuit configured to monitor a second temperature of an EHC of the catalyst assembly;
a third electronic circuit configured to select an engine speed maintaining mode and an air pumping mode and generate a mode signal based on the first temperature and the second temperature;
a fourth electronic circuit configured to initiate at least one pumping action to pump air into an inlet of the catalyst assembly during the air pumping mode,
wherein the at least one pumping action includes (i) rotating a crankshaft of the engine when the engine is deactivated and (ii) activating an air pump; and
a fifth electronic circuit configured to compare the second temperature to a maximum EHC convection temperature and generate a first comparison signal,
wherein the third electronic circuit is configured to select the air pumping mode if the first comparison signal indicates the second temperature being greater than the maximum EHC convection temperature, and
wherein the third electronic circuit is configured to select the engine speed maintaining mode if the first comparison signal indicates the second temperature being less than or equal to the maximum EHC convection temperature.

12. The catalyst heating system of claim 11, further comprising a sixth electronic circuit configured to compare the first temperature to a catalyst light off temperature and generate a second comparison signal,
wherein the third electronic circuit is configured to select the air pumping mode when the first comparison signal indicates that the first temperature is less than the light off temperature.

13. The catalyst heating system of claim 12, further comprising a seventh electronic circuit configured to compare the second temperature to a minimum EHC convection temperature and generate a third comparison signal,
wherein the third electronic circuit is configured to select the engine speed maintaining mode when the third comparison signal indicates that the second temperature is less than the minimum EHC convection temperature, and
wherein the third electronic circuit is configured to select air pumping mode when the third comparison signal indicates that the second temperature is greater than or equal to the minimum EHC convection temperature.

14. A method of operating a catalyst heating system comprising:
monitoring at least one of (i) a first temperature of a non-electrically heated catalyst (EHC) of a catalyst assembly in an exhaust system of an engine and (ii) an active catalyst volume of the catalyst assembly;
selecting an EHC heating mode and generating a mode signal based on the at least one of the first temperature and the active catalyst volume; and
controlling current to an EHC of the catalyst assembly based on the mode signal;
monitoring a second temperature of the EHC;
generating the mode signal based on the second temperature;
comparing the second temperature to a maximum EHC convection temperature and generating a second comparison signal;
selecting an air pumping mode if the second comparison signal indicates the second temperature being greater than the maximum EHC convection temperature;
during the air pumping mode, initiating at least one pumping action to pump air into an inlet of the catalyst assembly; and
selecting an engine speed maintaining mode if the second comparison signal indicates that the second temperature is less than or equal to the maximum EHC convection temperature.

15. The method of claim 14, further comprising, based on the second temperature, selecting an engine speed maintaining mode and an air pumping mode and generating the mode signal,
wherein the at least one pumping action includes (i) rotating a crankshaft of the engine when the engine is deactivated and (ii) activating an air pump.

16. The catalyst heating system of claim 1, further comprising a sixth electronic circuit configured to compare the second temperature to a second EHC convection temperature,
wherein the second electronic circuit is configured to deactivate the air pumping mode when the second temperature is less than the second EHC convection temperature to maintain the second temperature at a temperature greater than or equal to the second EHC convection temperature, and
wherein maintaining the second temperature at the temperature greater than or equal to the second EHC convection temperature, maintains the first temperature of the non-EHC at a temperature greater than a catalyst light off temperature.

17. The catalyst heating system of claim 7, wherein each of the first electronic circuit, the second electronic circuit, the third electronic circuit, the fourth electronic circuit, the fifth electronic circuit, the sixth electronic circuit, the seventh electronic circuit, and the eighth electronic circuit includes at least one of an electronic circuit, an application specific integrated circuit, a processor, memory, and a combinational logic circuit.

* * * * *